US012594547B2

(12) United States Patent
Li et al.

(10) Patent No.: US 12,594,547 B2
(45) Date of Patent: Apr. 7, 2026

(54) PREPARATION METHOD OF METAL OXIDE LOADED NANO ZEOLITE PARTICLE CATALYST

(71) Applicant: TAIYUAN UNIVERSITY OF TECHNOLOGY, Taiyuan (CN)

(72) Inventors: Ruifeng Li, Taiyuan (CN); Fei Wang, Taiyuan (CN); Jiayao Qi, Taiyuan (CN); Jinghong Ma, Taiyuan (CN); Jiajun Zheng, Taiyuan (CN); Binbin Fan, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 529 days.

(21) Appl. No.: 18/351,762

(22) Filed: Jul. 13, 2023

(65) Prior Publication Data

US 2025/0018380 A1     Jan. 16, 2025

(51) Int. Cl.
| | |
|---|---|
| *B01J 29/40* | (2006.01) |
| *B01J 6/00* | (2006.01) |
| *B01J 35/61* | (2024.01) |
| *B01J 35/64* | (2024.01) |
| *B01J 37/02* | (2006.01) |
| *B01J 37/04* | (2006.01) |
| *B01J 37/06* | (2006.01) |
| *B01J 37/08* | (2006.01) |

(52) U.S. Cl.
CPC .............. *B01J 29/40* (2013.01); *B01J 6/001* (2013.01); *B01J 35/615* (2024.01); *B01J*
*35/657* (2024.01); *B01J 37/0205* (2013.01); *B01J 37/04* (2013.01); *B01J 37/06* (2013.01); *B01J 37/08* (2013.01)

(58) Field of Classification Search
CPC . B01J 29/40; B01J 6/001; B01J 35/615; B01J 35/657; B01J 37/0205; B01J 37/04; B01J 37/06; B01J 37/08; B01J 37/0207; B01J 29/44; B01J 29/46; B01J 29/48
See application file for complete search history.

(56) References Cited

U.S. PATENT DOCUMENTS

| | | | |
|---|---|---|---|
| 11,213,810 B1 * | 1/2022 | Ding | B01J 35/615 |
| 11,278,873 B2 * | 3/2022 | Al-Eid | B01J 35/647 |

(Continued)

*Primary Examiner* — Christina A Johnson
*Assistant Examiner* — David Andrew Calderon
(74) *Attorney, Agent, or Firm* — HOWARD M COHN and Associates, LLC

(57) ABSTRACT

The present disclosure relates to a technical field of preparation of zeolite molecular sieve catalysts, and in particular relates to a preparation method of a metal oxide loaded nano zeolite particle catalyst. In the preparation method, industrial γ-alumina balls are treated with a quaternary ammonium alkali solution, then pretreated γ-alumina balls are mixed with a zeolite precursor solution and are hydrothermally crystallized. Then a two-step high-temperature heat treatment is performed to obtain an alumina loaded zeolite nano particle material, solving problems of large zeolite dosage and poor dispersion in hydrocracking catalysts. Finally, the metal oxide loaded nano zeolite particle catalyst is obtained by combining transition metals. Nano zeolite particles prepared regulate a surface acidity of alumina, and exfoliated zeolites may be used independently as a catalyst, which saves cost and improves a utilization of the zeolites.

8 Claims, 5 Drawing Sheets

Intensity (a.u.)

2θ (degree)

(56) References Cited

U.S. PATENT DOCUMENTS

| | | | | |
|---|---|---|---|---|
| 2002/0040168 | A1* | 4/2002 | Kustov | B01J 29/40 |
| | | | | 502/64 |
| 2017/0291167 | A1* | 10/2017 | Ding | B01J 23/755 |
| 2024/0174524 | A1* | 5/2024 | Ding | B01J 37/08 |

* cited by examiner

Intensity (a.u.)

Intensity (a.u.)

20 (degree)

Intensity (a.u.)

PREPARATION METHOD OF METAL OXIDE LOADED NANO ZEOLITE PARTICLE CATALYST

TECHNICAL FIELD

The present disclosure relates to a technical field of preparation of zeolite molecular sieve catalysts, and in particular relates to a preparation method of a metal oxide loaded nano zeolite particle catalyst.

BACKGROUND

Hydrogenation catalytic conversion reaction is generally based on hydrofining catalyst (HDT) and hydrocracking catalyst (HDC). The catalysts of the hydrogenation catalytic conversion reaction comprise two types of active sites, where a first type of the active sites is metal active sites, and a second type of the active sites is acid active sites. Improving dispersibility of the two types of active sites and ensuring distances between the two types of active sites is the most effective method for improving a catalytic performance.

A preparation method of conventional continuous reaction catalysts is mainly based on a mechanical grinding mixture of zeolites and metal-loaded supports. The preparation method not only causes two active sites to be unevenly dispersed, but also makes the acid sites far away from the metal sites. As a result, a synergistic effect between the active sites is greatly weakened, which is not conducive to the hydrogenation catalytic conversion reaction.

A conventional method of directly loading metals on the zeolites has been extensively studied. Although the conventional method greatly increases the distance between the active sites, due to large size of metal cations, the zeolites are unable to be completely filled by diffusion during a metal impregnation process, leading to accumulation of large particles of metals on surfaces of the zeolites, which ultimately affects activity of the catalysts.

Currently, alumina is a common binder and metal support for industrial HDT. However, the alumina only has weak acid sites, which are unable to meet requirements of catalytic cracking reactions, while the zeolites are widely used as acid catalysts. To ensure the dispersion of the zeolites in mixture of the alumina and the zeolites, a content of zeolites is about 15-30% of the mixture. However, due to the mixture is not uniformly mixed by mechanical mixing, dispersibility of the active sites of the zeolites is poor, so that part of the zeolites cannot act as the catalyst, resulting in waste of the zeolites and increasing production costs.

SUMMARY

A purpose of the present disclosure is to provide a preparation method of a metal oxide loaded nano zeolite particle catalyst. By using alumina loaded nano zeolite particles, problems of poor dispersion of zeolites in HDT, a low utilization of the zeolites, and a long distance between metal oxides and the zeolites due to nonuniformity of mechanical mixing.

To achieve the above purpose, the present disclosure provides the preparation method of the metal oxide loaded nano zeolite particle catalyst. The preparation method comprises:

S1: pretreating industrial $\gamma$-Al$_2$O$_3$ balls: adding a quaternary ammonium alkali solution to wash industrial $\gamma$-Al$_2$O$_3$ balls, and then drying to obtain pretreated $\gamma$-Al$_2$O$_3$ balls;

S2: synthesizing an alumina loaded zeolite material via a hydrothermal method: mixing a silicon source, an aluminum source, an alkali source, a template agent, and deionized water to generate a zeolite precursor solution, then adding the pretreated $\gamma$-Al$_2$O$_3$ balls obtained in a step S1 to obtain mixture; transferring the mixture into a hydrothermal reaction kettle; hydrothermally crystallizing the mixture to generate an alumina loaded zeolite material; taking out the alumina loaded zeolite material; washing the alumina loaded zeolite material with the deionized water for several times and then drying the alumina loaded zeolite material to obtain a dried alumina loaded zeolite material;

S3: preforming a two-step high-temperature heat treatment: calcining the alumina loaded zeolite material in a step S2 at a low temperature, then performing ammonium exchange, and then calcining at a high temperature to obtain an alumina loaded nano zeolite particle material; and S4: loading metal: preparing a salt solution containing Group VIB metals and/or Group VIII metals, adding the alumina loaded nano zeolite particle material prepared in a step S3, drying after impregnation, and finally calcining to obtain the metal oxide loaded nano zeolite particle catalyst.

In the step S1, an average diameter of the industrial $\gamma$-Al$_2$O$_3$ balls is 1-2 mm, and a specific surface area of the industrial $\gamma$-Al$_2$O$_3$ balls is 180 m$^2$/g. The quaternary ammonium alkali solution is one of a tetramethylammonium hydroxide solution, a tetraethylammonium hydroxide solution, a tetrapropylammonium hydroxide solution, and a tetrabutylammonium hydroxide solution.

The zeolite precursor solution in the step S2 is one of a ZSM-5 zeolite precursor solution, a Beta zeolite precursor solution, a Y-type zeolite precursor solution, and a mercerized zeolite precursor solution. The silicon source is one of 30 wt % alkaline silica sol, fumed silicon oxide, and ethyl orthosilicon oxidete. The aluminum source is one of sodium aluminate, aluminum isopropoxide, and aluminum sulfate. The alkali source is sodium hydroxide. The templating agent is one of tetraethylammonium hydroxide, tetrapropylammonium hydroxide, tetrabutylammonium hydroxide and triethylamine.

The quaternary ammonium alkali solution is the tetrapropylammonium hydroxide solution.

The zeolite precursor solution in the step S2 is the ZSM-5 zeolite precursor solution. The silicon source is the 30 wt % alkaline silica sol. The aluminum source is the sodium aluminate. The alkali source is sodium hydroxide; the templating agent is the tetrabutylammonium hydroxide.

The silicon oxide, the sodium aluminate, the sodium hydroxide, the tetrapropylammonium hydroxide, and the deionized water of the zeolite precursor solution in the step S2 are in a weight ratio of 28-80:1:1-4:58-133:173-633. The mixture is hydrothermally crystallized at a temperature of 160-180° C. for 12-48 hours.

The alumina loaded zeolite material is calcined at the low temperature of 300-400° C. for 6-10 hours, and then calcined at the high temperature of 600-700° C. for 6-10 hours.

The salt solutions containing Group VIB metals and Group VIII metals in a step S4 is one or two of a nickel nitrate solution, a cobalt nitrate solution, an ammonium molybdate solution, and a ammonium tungstate solution.

Compared with the prior art, in the present disclosure, the industrial $\gamma$-alumina balls is pretreated by the quaternary ammonium alkali solution, which not only removes impurities on surfaces of the industrial $\gamma$-alumina balls, but also etches the surfaces of the industrial γ-alumina balls to create defect sites, so as to facilitate nucleation and growth of the zeolites.

Under a condition of no other follow-up treatment, the nano zeolite particle material is obtained by preforming the two-step high-temperature heat treatment, which simplifies steps of the preparation method, improves stability of loading of the zeolite, and improves efficiency.

Preparation of nano zeolite particle material not only regulates acidity of the surfaces of the γ-alumina balls, but also exfoliated zeolites are able to be used as a catalyst, which saves production costs and increases a utilization of the zeolite.

The nano zeolite particle material of low loading is beneficial to reduction of the metal oxides loaded thereon, avoiding the agglomeration of metal particles, and contributing to a good synergistic effect of metal sites with acid sites.

DETAILED DESCRIPTION

Figure 1:
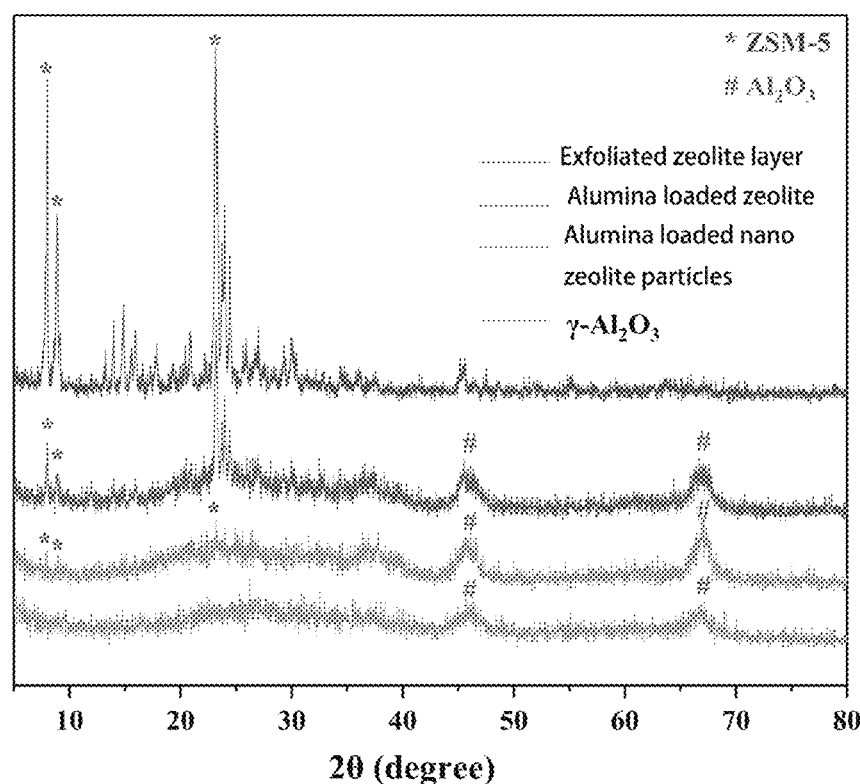
FIG. 1 is an X-ray diffraction (XRD) diagram of alumina loaded zeolite material and alumina loaded nano zeolite particle material of Embodiment 2.

Technical solutions of the present disclosure will be further described below in conjunction with the accompanying drawings and specific embodiments.

Embodiment 1

Pretreating Industrial γ-Alumina Balls:

Taking 15 ml of a tetrapropylammonium hydroxide solution (25 wt %). Mixing the tetrapropylammonium hydroxide solution with 5 g of industrial γ-alumina balls. Processing the tetrapropylammonium hydroxide solution with the industrial γ-alumina balls for 15 min under ultrasonic waves. Drying the industrial γ-alumina balls to obtain pretreated γ-alumina balls.

Synthesizing an Alumina Loaded Zeolite Material Via a Hydrothermal Method:

Adding 0.06 g of sodium aluminate, 0.25 g of sodium hydroxide, and 8 g of the tetrapropylammonium hydroxide solution to 38 g of deionized water, and stirring them to form a clear solution. Then adding 16 g of alkaline silica sol (30 wt %) dropwise, and continuously stirring for 4 h to generate a zeolite precursor solution. A weight ratio of silicon oxide, the sodium aluminate, the sodium hydroxide, tetrapropylammonium hydroxide, and the deionized water contained in the zeolite precursor solution is 80:1:4:133:633. Then adding 3 g of the pretreated γ-alumina balls to the zeolite precursor solution to stir to obtain mixture. Transferring the mixture into a hydrothermal reaction kettle and reacting at a hydrothermal temperature of 160° C. for 12 h to obtain a solid substance. Taking out the solid substance and washing the solid substance with the deionized water for 3 times to obtain the alumina loaded zeolite material. Drying the alumina loaded zeolite material to obtain a dried alumina loaded zeolite material.

Preparing an Alumina Loaded Nano Zeolite Particle Material:

Placing 2 g of the dried alumina loaded zeolite material in a muffle furnace, and calcining the dried alumina loaded zeolite material at 300° C. for 6 h under an air atmosphere to generate a calcined product. Adding the calcined product to 20 ml of 1.00 mol/L ammonium chloride solution in a water bath and shaking at 40° C. for 6 h, and dry it. Afterwards, calcining at 600° C. for 6 h to obtain the alumina loaded nano zeolite particle material.

Preparing a Metal Oxide Loaded Nano Zeolite Particle Catalyst:

Preparing 10 ml of a salt solution containing 0.11 g of nickel nitrate. Adding 2 g of the alumina loaded nano zeolite particle material into the salt solution, shaking in a water bath for 6 h and drying them to obtain a semi-finished product. Calcining the semi-finished product in the muffle furnace at 300° C. for 5 h to obtain the metal oxide loaded nano zeolite particle catalyst.

Embodiment 2

Pretreating Industrial γ-Alumina Balls:

Taking 17 ml of the tetrapropylammonium hydroxide solution (25 wt %). Mixing the tetrapropylammonium hydroxide solution with 5.50 g of the industrial γ-alumina balls. Processing the tetrapropylammonium hydroxide solution with the industrial γ-alumina balls for 16 min under the ultrasonic waves. Drying the industrial γ-alumina balls to obtain pretreated γ-alumina balls.

Synthesizing an Alumina Loaded Zeolite Material Via a Hydrothermal Method:

Adding 0.08 g of the sodium aluminate, 0.26 g of the sodium hydroxide, and 9 g of the tetrapropylammonium hydroxide solution to 39 g of the deionized water, and stirring them to form a clear solution. Then adding 17 g of alkaline silica sol (30 wt %) dropwise, and continuously stirring for 5 h to generate a zeolite precursor solution. A weight ratio of the silicon oxide, the sodium aluminate, the sodium hydroxide, tetrapropylammonium hydroxide, and the deionized water contained in the zeolite precursor solution is 64:1:3:112:488. Then adding 3.50 g of the pretreated γ-alumina balls to the zeolite precursor solution to stir to obtain mixture. Transferring the mixture into the hydrothermal reaction kettle and reacting at a hydrothermal temperature of 165° C. for 14 h to obtain a solid substance. Taking out the solid substance and washing the solid substance with the deionized water for 4 times to obtain the alumina loaded zeolite material. Drying the alumina loaded zeolite material to obtain a dried alumina loaded zeolite material.

Preparing an Alumina Loaded Nano Zeolite Particle Material:

Placing 2.50 g of the dried alumina loaded zeolite material in the muffle furnace, and calcining the dried the alumina loaded zeolite material at 320° C. for 7 h under the air atmosphere to generate a calcined product. Adding the calcined product to 25 ml of 1.00 mol/L ammonium chloride solution in the water bath and shaking at 50° C. for 7 h, and dry it. Afterwards, calcining at 610° C. for 7 h to obtain the alumina loaded nano zeolite particle material.

Preparing a Metal Oxide Loaded Nano Zeolite Particle Catalyst:

Preparing 12 ml of a salt solution containing 0.16 g of cobalt nitrate. Adding 2.50 g of the alumina loaded nano zeolite particle material into the salt solution, shaking in the water bath for 6 h and drying them to obtain a semi-finished product. Calcining the semi-finished product in the muffle furnace at 320° C. for 6 h to obtain the metal oxide loaded nano zeolite particle catalyst.

Comparative Embodiment 1

As a comparison, the embodiment adopts the same scheme as embodiment 2 to hydrothermally synthesize the alumina loaded zeolite, and the only difference is that no pretreated γ-alumina balls are added.

Prepared zeolites are washed, dried and placed in the muffle furnace and calcined at 320° C. for 7 h under the air atmosphere, then ammonium exchange is performed by the 1.00 mol/L ammonium chloride solution, and finally dried sample is calcined in the air atmosphere at 610° C. for 7 h to obtain zeolites.

The γ-alumina balls are ground into powder and added to a certain mass of the above zeolites. The power and the zeolites are mixed and ground and then granulated (20-40 mesh) to obtain a mechanically ground composite catalyst of zeolite and alumina.

Comparative Embodiment 2

As a comparison, the mechanically ground composite catalyst of zeolite and alumina of the embodiment is synthesized by the same method as that of the comparative embodiment 1, where the only difference is that the powder and the certain mass of the above zeolites are separately granulated (20-40 mesh) and then mixed to obtain the mechanically ground composite catalyst.

As shown in FIG. 1, structures, cross-sectional morphology, and elemental distributions at the cross-sections of the alumina loaded zeolite material and the alumina loaded nano-zeolite particulate material prepared in the embodiment 2 are tested, and characteristic diffraction peaks of ZSM-5 zeolite in a range of 7-10° and 22.5-25° are observed, indicating that alumina loaded ZSM-5 zeolites are successfully synthesized. The characteristic diffraction peaks of ZSM-5 and γ-alumina are observed in an X-ray diffraction (XRD) diagram of the final alumina loaded nano zeolite particle material, but the intensity of the characteristic diffraction peaks of ZSM-5 is significantly reduced, which proves that the alumina loaded nano zeolite particle material is successfully prepared.

Figure 3A:
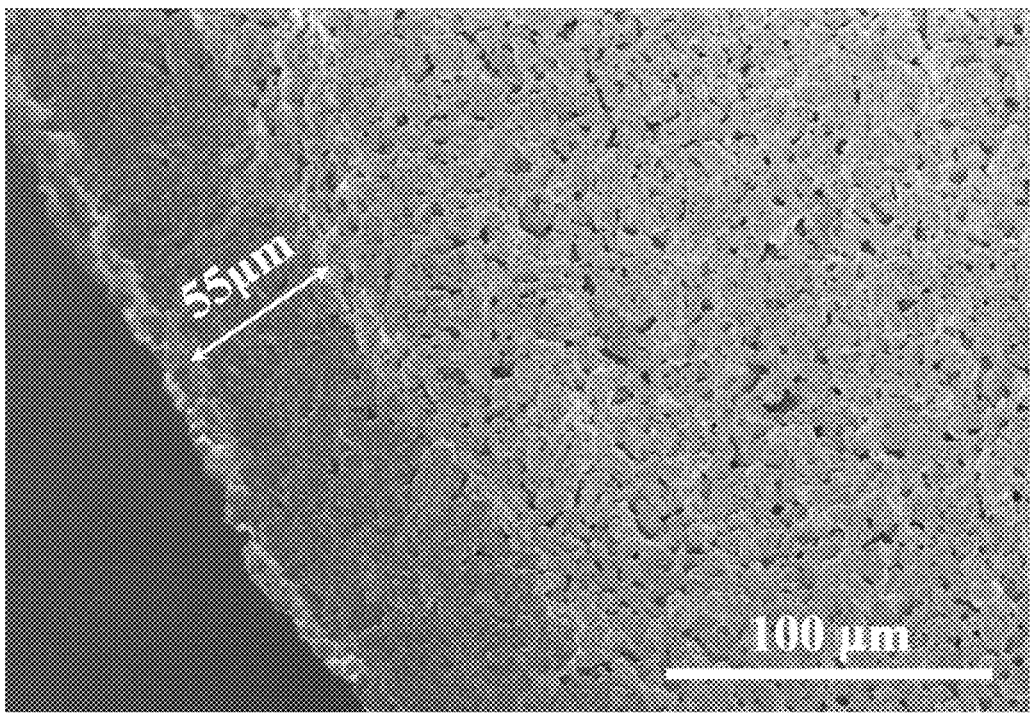
FIG. 3A is a scanning electron microscope (SEM) diagram of a cross-section of the alumina loaded zeolite material of the Embodiment 2.
Figure 3B:
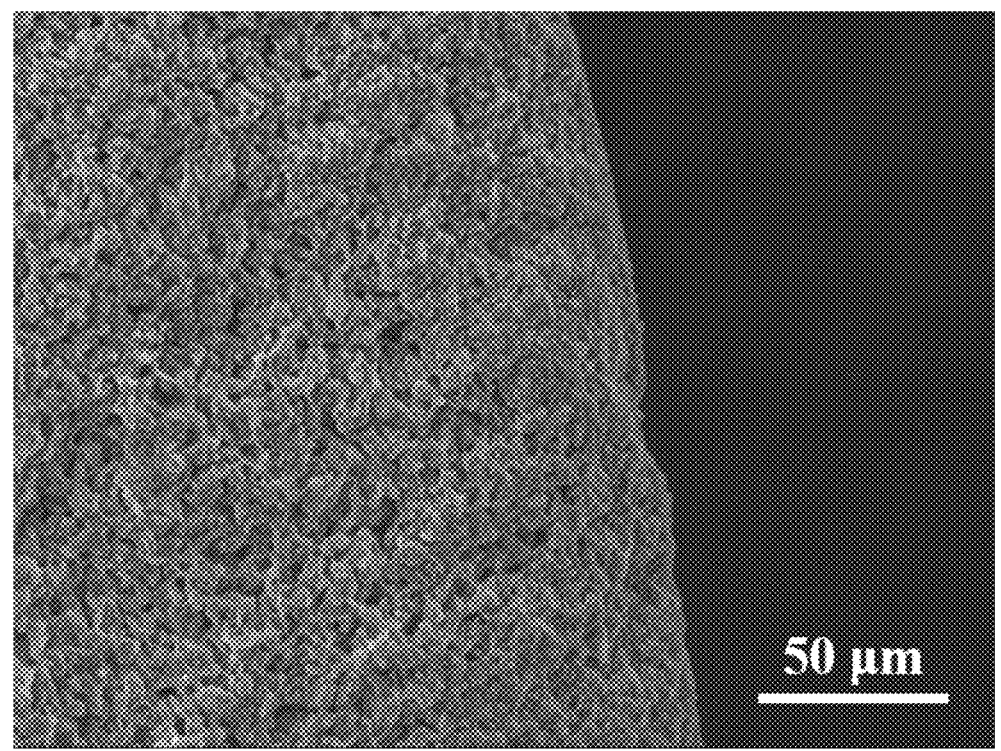
FIG. 3B is an SEM diagram of a cross-section of the alumina loaded nano zeolite particle material of the Embodiment 2.

As shown in FIGS. 3A-6, FIG. 3A is a scanning electron microscope (SEM) diagram of a cross-section of the alumina loaded zeolite material of the Embodiment 2, and FIG. 3B is an SEM diagram of a cross-section of the alumina loaded nano zeolite particle material of the Embodiment 2. As shown in FIG. 3A, it can be seen that there is a shell layer with a width of about 55 μm on an edge of the alumina loaded zeolite material of the Embodiment 2. From the cross-section of the alumina loaded zeolite material of Embodiment 2, it can be seen that the shell layer is formed by the accumulation of nano zeolites. Further, no obvious boundary layer is observed on an edge of the alumina loaded nano zeolite particle material of the Embodiment 2, and it is observed that there are many particulate substances on a surface of the alumina loaded nano zeolite particle material of the Embodiment 2, indicating that the thick zeolite layer is fallen off.

Figure 4A:
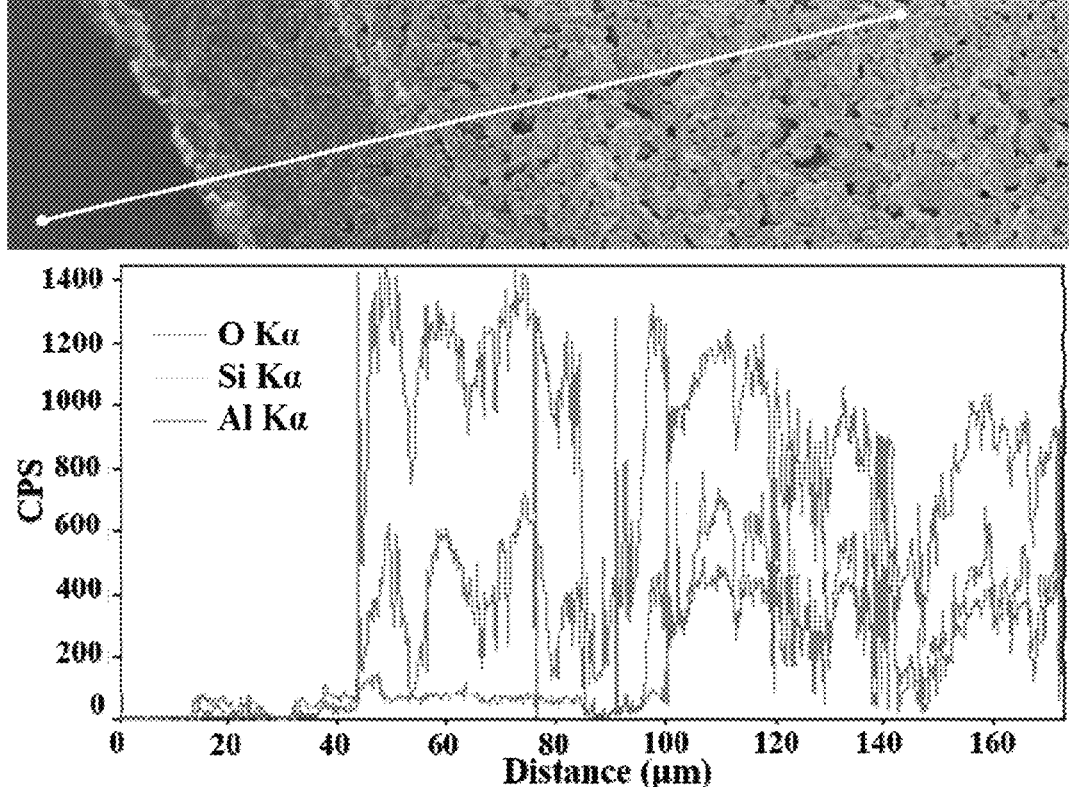
FIG. 4A is an energy dispersive spectroscopy (EDS) diagram of the cross-section shown in FIG. 3A.
Figure 4B:
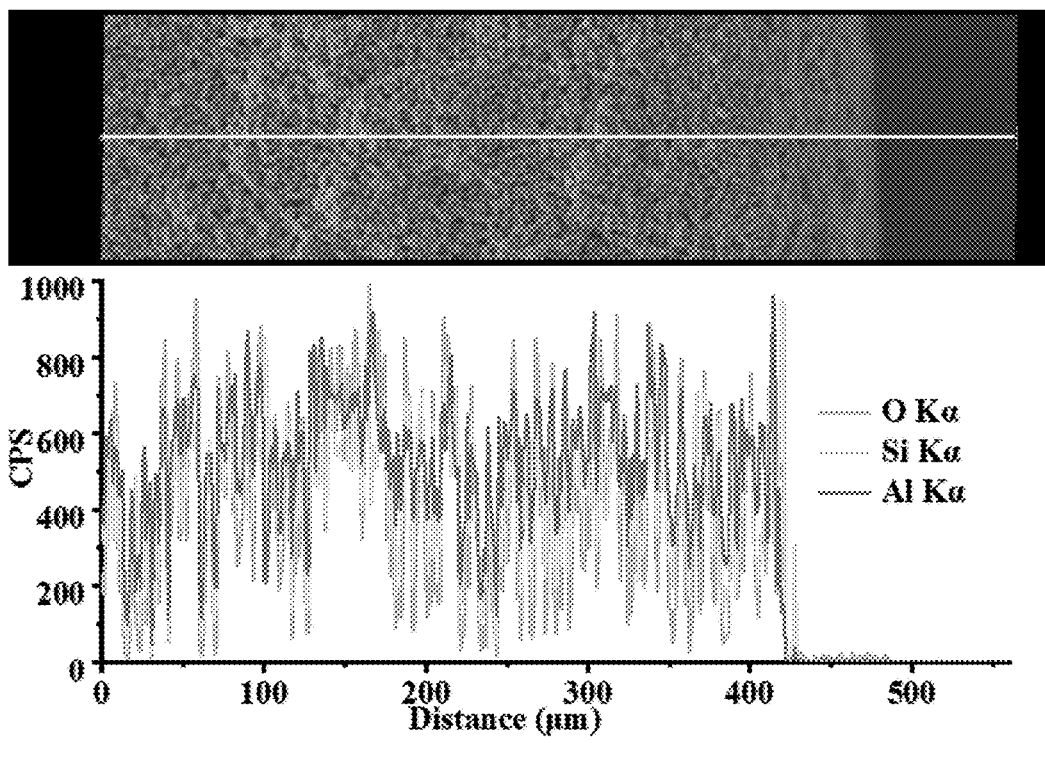
FIG. 4B is an EDS diagram of the cross-section shown in FIG. 3B.

FIG. 4A is an energy dispersive spectroscopy (EDS) diagram of the cross-section shown in FIG. 3A and FIG. 4B is an EDS diagram of the cross-section shown in FIG. 3B. As shown in FIG. 4A, it is observed that intensities of silicon, oxygen, and aluminum elements are different between the interior and the edge of the alumina loaded zeolite material, and an element intensity change distance at the edge of the alumina loaded zeolite material is about 55 μm. This result is basically consistent with the thickness measured by the SEM diagram of FIG. 3A, which further confirms that the alumina loaded zeolite material is successfully prepared.

As shown in FIG. 4B, it is observed that the element intensity change distance at the edge of the alumina loaded zeolite material, which is about a few microns in thickness, is obviously shortened, indicating that the thick zeolite layer is fallen off. Change of silicon and aluminum elements at the edge indicates that there are dispersed zeolite particles on a surface of the alumina, which is consistent with the results of the XRD diagram and proves that the alumina loaded nano zeolite particle material is successfully prepared.

Figure 5:
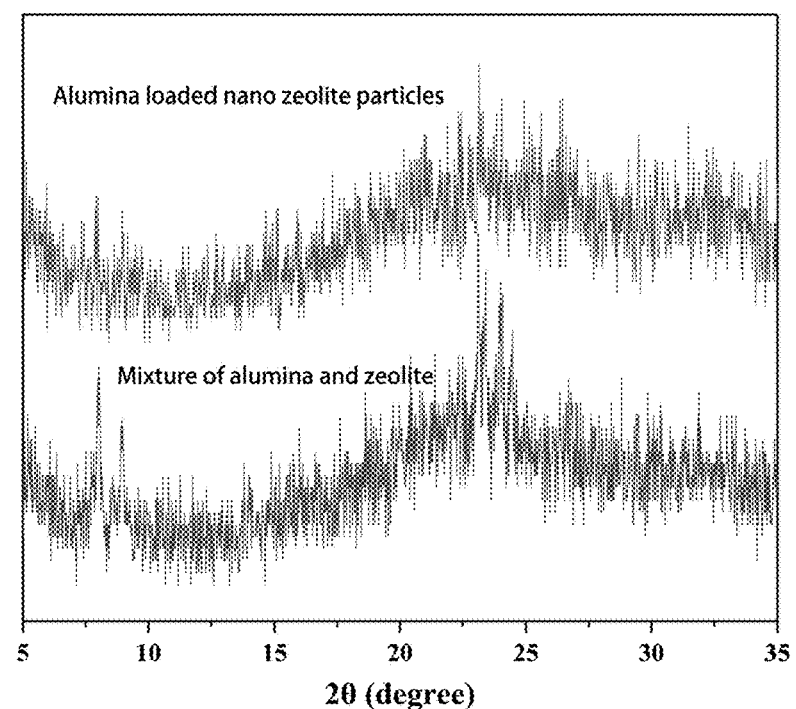
FIG. 5 is an XRD diagram of a metal oxide loaded nano zeolite particle catalyst of the embodiment 2 and a metal oxide loaded nano zeolite particle catalyst of comparative embodiment 1.

FIG. 5 is an XRD diagram of a metal oxide loaded nano zeolite particle catalyst of the embodiment 2 and the metal oxide loaded nano zeolite particle catalyst of comparative embodiment 1. It can be seen from FIG. 5 that intensity of characteristic diffraction peaks of ZSM-5 in the alumina loaded nano zeolite particle catalyst is lower than that of the mechanically ground composite catalyst, indicating that the present disclosure improves the dispersibility of the zeolite in alumina.

Figure 6:
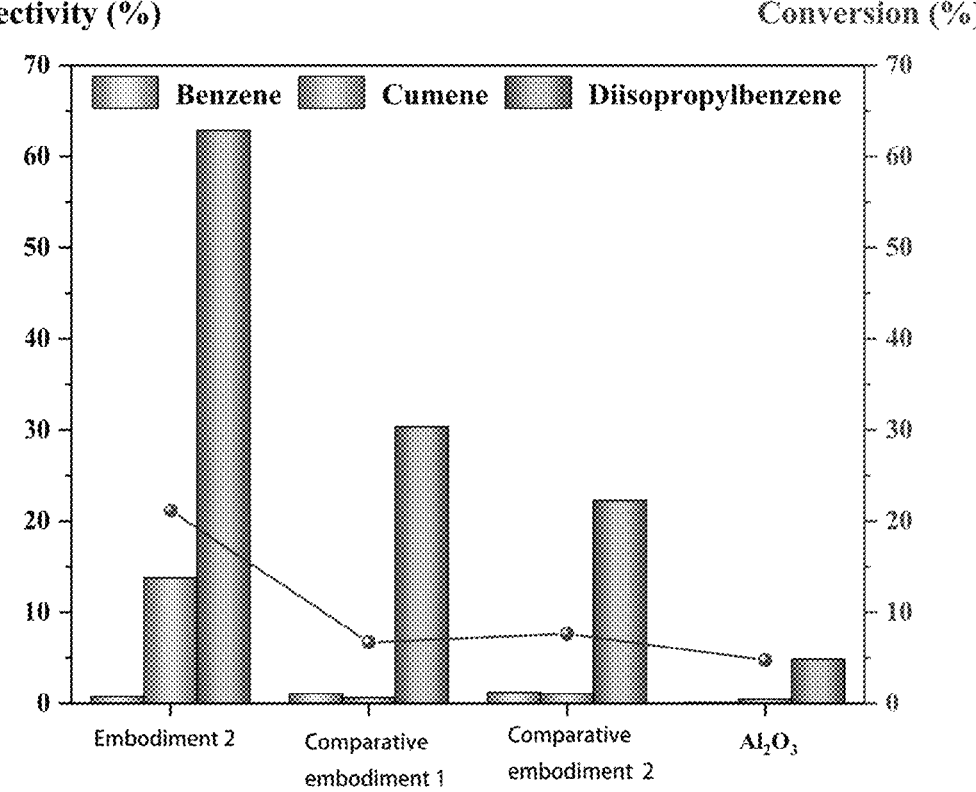
FIG. 6 is a schematic diagram showing catalytic and cracking of 1,3,5-triisopropylbenzene by the alumina loaded nano particle material prepared in the Embodiment 2.

FIG. 6 is a schematic diagram showing catalytic and cracking of 1,3,5-triisopropylbenzene by the alumina loaded nano particle material prepared in the Embodiment 2. As shown in FIG. 6, the alumina loaded nano zeolite particle catalyst exhibits higher conversion and product selectivity than the mechanically ground composite catalyst and the mechanically ground mixture, indicating that the present disclosure improves the dispersibility of the zeolite, thereby increasing a utilization of the zeolite. In addition, from cracking products, it is seen that after loading the nano zeolite particles, deep cracking products, such as cumene and benzene, are generated, indicating that acidity of the surface of the alumina is changed. There are not only weak acid sites on the surface of the alumina, but also medium-strong acid sites and strong acid sites on the surface of the alumina.

Embodiment 3

Pretreating Industrial γ-Alumina Balls:

Taking 18 ml of the tetrapropylammonium hydroxide solution (25 wt %). Mixing the tetrapropylammonium hydroxide solution with 6 g of the industrial γ-alumina balls. Processing the tetrapropylammonium hydroxide solution with the industrial γ-alumina balls for 17 min under ultrasonic waves. Drying the industrial γ-alumina balls to obtain pretreated γ-alumina balls.

Synthesizing an Alumina Loaded Zeolite Material Via a Hydrothermal Method:

Adding 0.10 g of the sodium aluminate, 0.27 g of the sodium hydroxide, and 10 g of the tetrapropylammonium hydroxide solution to 40 g of the deionized water, and stirring them to form a clear solution. Then adding 18 g of the alkaline silica sol (30 wt %) dropwise, and continuously stirring for 6 h to generate a zeolite precursor solution. A weight ratio of the silicon oxide, the sodium aluminate, the sodium hydroxide, the tetrapropylammonium hydroxide, and the deionized water contained in the zeolite precursor solution is 54:1:3:100:400. Then adding 4 g of the pretreated γ-alumina balls to the zeolite precursor solution to stir to obtain mixture. Transferring the mixture into the hydrothermal reaction kettle and reacting at a hydrothermal temperature of 170° C. for 16 h to obtain a solid substance. Taking out the solid substance and washing the solid substance with the deionized water for 5 times to obtain the alumina loaded zeolite material. Drying the alumina loaded zeolite material to obtain a dried alumina loaded zeolite material.

Preparing an Alumina Loaded Nano Zeolite Particle Material:

Placing 3 g of the dried alumina loaded zeolite material in the muffle furnace, and calcining the dried alumina loaded zeolite material at 330° C. for 8 h under an air atmosphere to generate a calcined product. Adding the calcined product to 30 ml of 1.00 mol/L ammonium chloride solution in the water bath and shaking at 55° C. for 8 h, and dry it. Afterwards, calcining at 620° C. for 8 h to obtain the alumina loaded nano zeolite particle material.

Preparing a Metal Oxide Loaded Nano Zeolite Particle Catalyst:

Preparing 15 ml of a salt solution containing 0.21 g of ammonium molybdate. Adding 3 g of the alumina loaded nano zeolite particle material into the salt solution, shaking in the water bath for 7 h and drying them to obtain a semi-finished product. Calcining the semi-finished product in the muffle furnace at 340° C. for 7 h to obtain the metal oxide loaded nano zeolite particle catalyst.

Embodiment 4

Pretreating Industrial γ-Alumina Balls:

Taking 19 ml of the tetrapropylammonium hydroxide solution (25 wt %). Mixing the tetrapropylammonium hydroxide solution with 6.50 g of the industrial γ-alumina balls. Processing the tetrapropylammonium hydroxide solution with the industrial γ-alumina balls for 18 min under ultrasonic waves. Drying the industrial γ-alumina balls to obtain pretreated γ-alumina balls.

Synthesizing an Alumina Loaded Zeolite Material Via a Hydrothermal Method:

Adding 0.12 g of the sodium aluminate, 0.28 g of the sodium hydroxide, and 11 g of the tetrapropylammonium hydroxide solution to 41 g of the deionized water, and stirring them to form a clear solution. Then adding 19 g of alkaline silica sol (30 wt %) dropwise, and continuously stirring for 7 h to generate a zeolite precursor solution. A weight ratio of the silicon oxide, the sodium aluminate, the sodium hydroxide, the tetrapropylammonium hydroxide, and the deionized water contained in the zeolite precursor solution is 48:1:2:92:342. Then adding 4.50 g of the pretreated γ-alumina balls to the zeolite precursor solution to stir to obtain mixture. Transferring the mixture into the hydrothermal reaction kettle and reacting at a hydrothermal temperature of 175° C. for 18 h to obtain a solid substance. Taking out the solid substance and washing the solid substance with the deionized water for 3 times to obtain the alumina loaded zeolite material. Drying the alumina loaded zeolite material to obtain a dried alumina loaded zeolite material.

Preparing an Alumina Loaded Nano Zeolite Particle Material:

Placing 3.5 g of the dried alumina loaded zeolite material in the muffle furnace, and calcining the dried alumina loaded zeolite material at 340° C. for 9 h under the air atmosphere to generate a calcined product. Adding the calcined product to 35 ml of 1.00 mol/L ammonium chloride solution in the water bath and shaking at 60° C. for 7 h, and dry it. Afterwards, calcining at 630° C. for 9 h to obtain the alumina loaded nano zeolite particle material.

Preparing a Metal Oxide Loaded Nano Zeolite Particle Catalyst:

Preparing 20 ml of a salt solution containing 0.18 g of ammonium tungstate. Adding 3.5 g of the alumina loaded nano zeolite particle material into the salt solution, shaking in the water bath for 8 h and drying them to obtain a semi-finished product. Calcining the semi-finished product in the muffle furnace at 360° C. for 8 h to obtain the metal oxide loaded nano zeolite particle catalyst.

Embodiment 5

Pretreating Industrial γ-Alumina Balls:

Taking 20 ml of the tetrapropylammonium hydroxide solution (25 wt %). Mixing the tetrapropylammonium hydroxide solution with 7 g of the industrial γ-alumina balls. Processing the tetrapropylammonium hydroxide solution with the industrial γ-alumina balls for 19 min under ultrasonic waves. Drying the industrial γ-alumina balls to obtain pretreated γ-alumina balls.

Synthesizing an Alumina Loaded Zeolite Material Via a Hydrothermal Method:

Adding 0.14 g of the sodium aluminate, 0.29 g of the sodium hydroxide, and 12 g of the tetrapropylammonium hydroxide solution to 42 g of deionized water, and stirring them to form a clear solution. Then adding 20 g of the alkaline silica sol (30 wt %) dropwise, and continuously stirring for 8 h to generate a zeolite precursor solution. A weight ratio of silicon oxide, the sodium aluminate, the sodium hydroxide, tetrapropylammonium hydroxide, and the deionized water contained in the zeolite precursor solution is 43:1:2:86:300. Then adding 5 g of the pretreated γ-alumina balls to the zeolite precursor solution to stir to obtain mixture. Transferring the mixture into the hydrothermal reaction kettle and reacting at a hydrothermal temperature of 180° C. for 20 h to obtain a solid substance. Taking out the solid substance and washing the solid substance with the deionized water for 4 times to obtain the alumina loaded zeolite material. Drying the alumina loaded zeolite material to obtain a dried alumina loaded zeolite material.

Preparing an Alumina Loaded Nano Zeolite Particle Material:

Placing 4 g of the dried alumina loaded zeolite material in the muffle furnace, and calcining the dried alumina loaded zeolite material at 350° C. for 10 h under the air atmosphere to generate a calcined product. Adding the calcined product to 40 ml of 1.00 mol/L ammonium chloride solution in the water bath and shaking at 60° C. for 6 h, and dry it. Afterwards, calcining at 640° C. for 10 h to obtain the alumina loaded nano zeolite particle material.

Preparing a Metal Oxide Loaded Nano Zeolite Particle Catalyst:

Preparing 20 ml of a salt solution containing 0.26 g of nickel nitrate and 0.34 g of ammonium molybdate. Adding 4 g of the alumina loaded nano zeolite particle material into the salt solution, shaking in the water bath for 7 h and drying them to obtain a semi-finished product. Calcining the semi-finished product in the muffle furnace at 380° C. for 7 h to obtain the metal oxide loaded nano zeolite particle catalyst.

Embodiment 6

Pretreating Industrial γ-Alumina Balls:

Taking 20 ml of the tetrapropylammonium hydroxide solution (25 wt %). Mixing the tetrapropylammonium hydroxide solution with 6 g of the industrial γ-alumina balls. Processing the tetrapropylammonium hydroxide solution with the industrial γ-alumina balls for 19 min under ultrasonic waves. Drying the industrial γ-alumina balls to obtain pretreated γ-alumina balls.

Synthesizing an Alumina Loaded Zeolite Material Via a Hydrothermal Method:

Adding 0.16 g of the sodium aluminate, 0.32 g of the sodium hydroxide, and 13 g of the tetrapropylammonium hydroxide solution to 43 g of the deionized water, and stirring them to form a clear solution. Then adding 21 g of alkaline silica sol (30 wt %) dropwise, and continuously stirring for 7 h to generate a zeolite precursor solution. A weight ratio of silicon oxide, the sodium aluminate, the sodium hydroxide, tetrapropylammonium hydroxide, and the deionized water contained in the zeolite precursor solution is 39:1:2:81:269. Then adding 4.50 g of the pretreated γ-alumina balls to the zeolite precursor solution to stir to obtain mixture. Transferring the mixture into the hydrothermal reaction kettle and reacting at a hydrothermal temperature of 180° C. for 24 h to obtain a solid substance. Taking out the solid substance and washing the solid substance with the deionized water for 5 times to obtain the alumina loaded zeolite material. Drying the alumina loaded zeolite material to obtain a dried alumina loaded zeolite material.

Preparing an Alumina Loaded Nano Zeolite Particle Material:

Placing 3.5 g of the dried alumina loaded zeolite material in the muffle furnace, and calcining the dried alumina loaded zeolite material at 360° C. for 8 h under the air atmosphere to generate a calcined product. Adding the calcined product to 35 ml of 1.00 mol/L ammonium chloride solution in the water bath and shaking at 55° C. for 7 h, and dry it. Afterwards, calcining at 650° C. for 8 h to obtain the alumina loaded nano zeolite particle material.

Preparing a Metal Oxide Loaded Nano Zeolite Particle Catalyst:

Preparing 20 ml of a salt solution containing 0.13 g of nickel nitrate and 0.15 g of ammonium tungstate. Adding 3 g of the alumina loaded nano zeolite particle material into the salt solution, shaking in the water bath for 6 h and drying them to obtain a semi-finished product. Calcining the semi-finished product in the muffle furnace at 400° C. for 6 h to obtain the metal oxide loaded nano zeolite particle catalyst.

Embodiment 7

Pretreating Industrial γ-Alumina Balls:

Taking 20 ml of the tetrapropylammonium hydroxide solution (25 wt %). Mixing the tetrapropylammonium hydroxide solution with 5 g of the industrial γ-alumina balls. Processing the tetrapropylammonium hydroxide solution with the industrial γ-alumina balls for 20 min under ultrasonic waves. Drying the industrial γ-alumina balls to obtain pretreated γ-alumina balls.

Synthesizing an Alumina Loaded Zeolite Material Via a Hydrothermal Method:

Adding 0.20 g of the sodium aluminate, 0.33 g of the sodium hydroxide, and 14 g of the tetrapropylammonium hydroxide solution to 44 g of the deionized water, and stirring them to form a clear solution. Then adding 22 g of alkaline silica sol (30 wt %) dropwise, and continuously stirring for 8 h to generate a zeolite precursor solution. A weight ratio of silicon oxide, the sodium aluminate, the sodium hydroxide, tetrapropylammonium hydroxide, and the deionized water contained in the zeolite precursor solution is 33:1:2:70:220. Then adding 4.50 g of the pretreated γ-alumina balls to the zeolite precursor solution to stir to obtain mixture. Transferring the mixture into the hydrothermal reaction kettle and reacting at a hydrothermal temperature of 180° C. for 36 h to obtain a solid substance. Taking out the solid substance and washing the solid substance with the deionized water for 4 times to obtain the alumina loaded zeolite material. Drying the alumina loaded zeolite material to obtain a dried alumina loaded zeolite material.

Preparing an Alumina Loaded Nano Zeolite Particle Material:

Placing 3 g of the dried alumina loaded zeolite material in the muffle furnace, and calcining the dried alumina loaded zeolite material at 370° C. for 8 h under the air atmosphere to generate a calcined product. Adding the calcined product to 35 ml of 1.00 mol/L ammonium chloride solution in the water bath and shaking at 55° C. for 6 h, and dry it. Afterwards, calcining at 660° C. for 8 h to obtain the alumina loaded nano zeolite particle material.

Preparing a Metal Oxide Loaded Nano Zeolite Particle Catalyst:

Preparing 16 ml of a salt solution containing 0.19 g of cobalt nitrate and 0.25 g of ammonium molybdate. Adding 3 g of the alumina loaded nano zeolite particle material into the salt solution, shaking in the water bath for 8 h and drying them to obtain a semi-finished product. Calcining the semi-finished product in the muffle furnace at 420° C. for 5 h to obtain the metal oxide loaded nano zeolite particle catalyst.

Embodiment 8

Pretreating Industrial γ-Alumina Balls:

Taking 22 ml of the tetrapropylammonium hydroxide solution (25 wt %). Mixing the tetrapropylammonium hydroxide solution with 6 g of the industrial γ-alumina balls. Processing the tetrapropylammonium hydroxide solution with the industrial γ-alumina balls for 18 min under ultrasonic waves. Drying the industrial γ-alumina balls to obtain pretreated γ-alumina balls.

Synthesizing an Alumina Loaded Zeolite Material Via a Hydrothermal Method:

Adding 0.26 g of the sodium aluminate, 0.35 g of the sodium hydroxide, and 15 g of the tetrapropylammonium hydroxide solution to 45 g of the deionized water, and stirring them to form a clear solution. Then adding 24 g of alkaline silica sol (30 wt %) dropwise, and continuously stirring for 8 h to generate a zeolite precursor solution. A weight ratio of silicon oxide, the sodium aluminate, the sodium hydroxide, tetrapropylammonium hydroxide, and the deionized water contained in the zeolite precursor solution is 28:1:1:58:173. Then adding 4.50 g of the pretreated γ-alumina balls to the zeolite precursor solution to stir to obtain mixture. Transferring the mixture into the hydrothermal reaction kettle and reacting at a hydrothermal temperature of 180° C. for 48 h to obtain a solid substance. Taking out the solid substance and washing the solid substance with the deionized water for 5 times to obtain the alumina loaded zeolite material. Drying the alumina loaded zeolite material to obtain a dried alumina loaded zeolite material.

Preparing an Alumina Loaded Nano Zeolite Particle Material:

Placing 4 g of the dried alumina loaded zeolite material in the muffle furnace, and calcining the dried alumina loaded zeolite material at 400° C. for 10 h under the air atmosphere to generate a calcined product. Adding the calcined product to 40 ml of 1.00 mol/L ammonium chloride solution in the water bath and shaking at 60° C. for 7 h, and dry it. Afterwards, calcining at 700° C. for 10 h to obtain the alumina loaded nano zeolite particle material.

Preparing a Metal Oxide Loaded Nano Zeolite Particle Catalyst:

Preparing 18 ml of a salt solution containing 0.17 g of cobalt nitrate and 0.19 g of ammonium tungstate. Adding 4 g of the alumina loaded nano zeolite particle material into the salt solution, shaking in the water bath for 7 h and drying them to obtain a semi-finished product. Calcining the semi-finished product in the muffle furnace at 450° C. for 4 h to obtain the metal oxide loaded nano zeolite particle catalyst.

Figure 2:
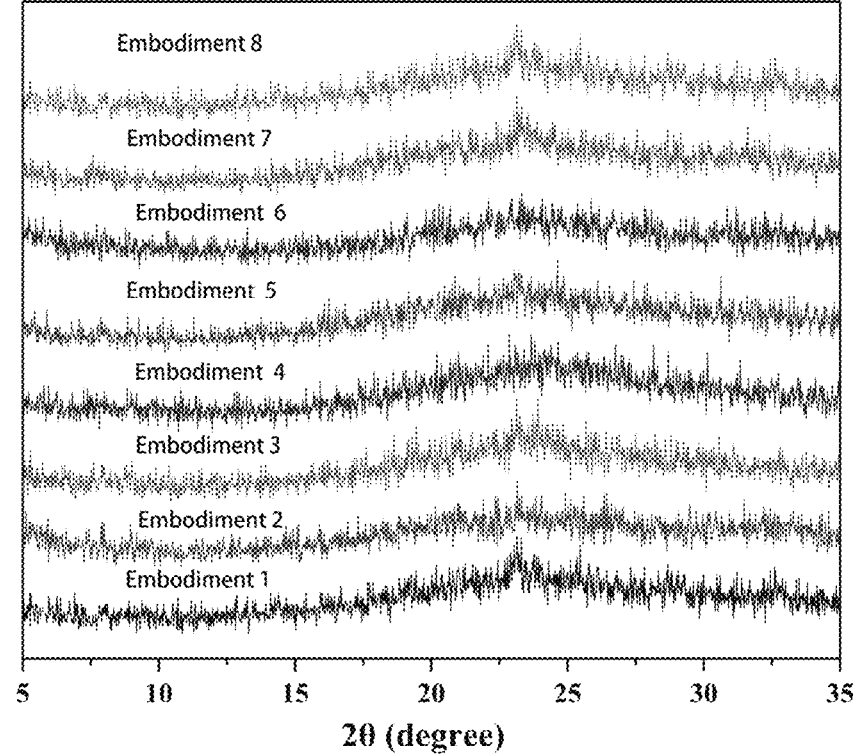
FIG. 2 is an XRD diagram of the alumina loaded nano zeolite particle material of Embodiments 1-8.

FIG. 2 is an XRD diagram of the alumina loaded nano zeolite particle materials of the embodiments 1-8. It is observed from FIG. 2 that all embodiments have characteristic diffraction peaks of ZSM-5, which shows that schemes of the embodiments are feasible.

In order to enable those skilled in the art to understand and implement the content of the present disclosure, the present disclosure has made a detailed description. However, the detailed description does not limit the protection scope of the present disclosure. All equivalent changes or modifications made according to the idea of the present disclosure shall fall within the protection scope of the present disclosure.

What is claimed is:

1. A preparation method of a metal oxide loaded nano zeolite particle catalyst, comprising:

S1: pretreating industrial $\gamma$-Al$_2$O$_3$ balls: adding a quaternary ammonium alkali solution to wash industrial $\gamma$-Al$_2$O$_3$ balls, and then drying to obtain pretreated $\gamma$-Al$_2$O$_3$ balls;

S2: synthesizing an alumina loaded zeolite material via a hydrothermal method: mixing a silicon source, an aluminum source, an alkali source, a template agent, and deionized water to generate a zeolite precursor solution, then adding the pretreated $\gamma$-Al$_2$O$_3$ balls obtained in a step S1 to obtain mixture; transferring the mixture into a hydrothermal reaction kettle; hydrothermally crystallizing the mixture to generate an alumina loaded zeolite material; taking out the alumina loaded zeolite material; washing the alumina loaded zeolite material with the deionized water for several times and then drying the alumina loaded zeolite material to obtain a dried alumina loaded zeolite material;

S3: preforming a two-step high-temperature heat treatment: calcining the dried alumina loaded zeolite material in a step S2 at a low temperature, then performing ammonium exchange, and then calcining at a high temperature to obtain an alumina loaded nano zeolite particle material; and S4: loading metal: preparing a salt solution containing Group VIB metals and/or Group VIII metals, adding the alumina loaded nano zeolite particle material prepared in a step S3, drying after impregnation, and finally calcining to obtain the metal oxide loaded nano zeolite particle catalyst.

2. The preparation method of the metal oxide loaded nano zeolite particle catalyst according to claim 1, wherein in the step S1, an average diameter of the industrial $\gamma$-Al$_2$O$_3$ balls is 1-2 mm, and a specific surface area of the industrial $\gamma$-Al$_2$O$_3$ balls is 180 m$^2$/g; the quaternary ammonium alkali solution is one of a tetramethylammonium hydroxide solution, a tetraethylammonium hydroxide solution, a tetrapropylammonium hydroxide solution, and a tetrabutylammonium hydroxide solution.

3. The preparation method of the metal oxide loaded nano zeolite particle catalyst according to claim 1, wherein the zeolite precursor solution in the step S2 is one of a ZSM-5 zeolite precursor solution, a Beta zeolite precursor solution, a Y-type zeolite precursor solution, and a mercerized zeolite precursor solution; the silicon source is one of 30 wt % alkaline silica sol, fumed silicon oxide, and ethyl orthosilicon oxidate; the aluminum source is one of sodium aluminate, aluminum isopropoxide, and aluminum sulfate; the alkali source is sodium hydroxide; the templating agent is one of tetraethylammonium hydroxide, tetrapropylammonium hydroxide, tetrabutylammonium hydroxide, and triethylamine.

4. The preparation method of the metal oxide loaded nano zeolite particle catalyst according to claim 2, wherein the quaternary ammonium alkali solution is the tetrapropylammonium hydroxide solution.

5. The preparation method of the metal oxide loaded nano zeolite particle catalyst according to claim 3, wherein the zeolite precursor solution in the step S2 is the ZSM-5 zeolite precursor solution; the silicon source is the 30 wt % alkaline silica sol; the aluminum source is the sodium aluminate; the alkali source is the sodium hydroxide; the templating agent is the tetrabutylammonium hydroxide.

6. The preparation method of the metal oxide loaded nano zeolite particle catalyst according to claim 5, wherein the 30 wt % alkaline silica sol, the sodium aluminate, the sodium hydroxide, the tetrapropylammonium hydroxide, and the deionized water of the zeolite precursor solution in the step S2 are in a weight ratio of 28-80:1:1-4:58-133:173-633; the mixture is hydrothermally crystallized at a temperature of 160-180° C. for 12-48 hours.

7. The preparation method of the metal oxide loaded nano zeolite particle catalyst according to claim 1, wherein the alumina loaded zeolite material is calcined at the low temperature of 300-400° C. for 6-10 hours, and then calcined at the high temperature of 600-700° C. for 6-10 hours.

8. The preparation method of the metal oxide loaded nano zeolite particle catalyst according to claim 1, wherein the salt solutions containing Group VIB metals and Group VIII metals in a step S4 is one or two of a nickel nitrate solution, a cobalt nitrate solution, an ammonium molybdate solution, and an ammonium tungstate solution.

* * * * *